H. F. CHAPPELL.
MANUFACTURE OF HYDROFLUORIC ACID FROM SILICON FLUORID.
APPLICATION FILED APR. 17, 1917.
1,244,032.
Patented Oct. 23, 1917.
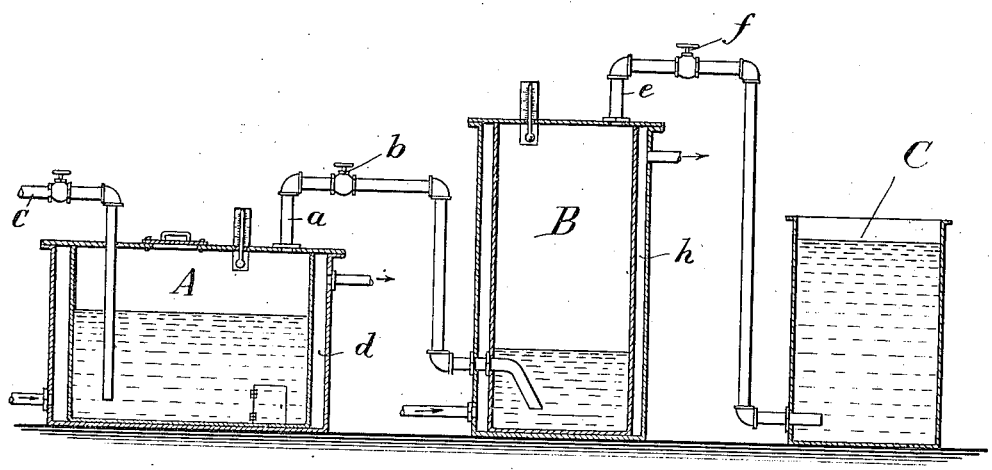

UNITED STATES PATENT OFFICE.

HOWARD FIELD CHAPPELL, OF NEW YORK, N. Y.

MANUFACTURE OF HYDROFLUORIC ACID FROM SILICON FLUORID.

1,244,032. Specification of Letters Patent. Patented Oct. 23, 1917.

Application filed April 17, 1917. Serial No. 162,719.

*To all whom it may concern:*

Be it known that I, HOWARD F. CHAPPELL, residing in the borough of Manhattan, in the county of New York, State of New York, have invented certain new and useful Improvements in Producing Hydrofluoric Acid from Silicon Fluorid; and I do hereby declare the following to be a full, clear, and exact description of the invention, such as will enable others skilled in the art to which it appertains to make and use the same.

The present invention is based upon the discovery that water or water vapor, under suitable conditions of temperature will so react upon silicon fluorid as to produce only silicon hydrate and hydrofluoric acid.

The invention is utilizable, accordingly, for producing hydrofluoric acid from silicon fluorid or from hydrofluosilicic acid, which acid, when evaporated, is decomposed into silicon fluorid and hydrofluoric acid. So also, it is utilizable for removing silicon fluorid from hydrofluoric acid, the reaction furnishing to the hydrofluoric acid an additional quantity thereof derived from the silicon fluorid present.

The reaction, characteristic of the practice of the invention may be represented by the formula:

1.  $SiF_4 + 4H_2O = Si(OH)_4 + 4HF$.

This reaction is reversible, and unless the conditions of temperature and moisture are so regulated that the reaction will proceed as above noted, it will be accompanied by the following reactions, in whole or in part, to wit:

2. $SiO_2 + 4HF = 2H_2O + SiF_4$
3. $SiF_4 + 2HF = H_2SiF_6$.

If all three of the above reactions take place, which will likewise occur, when the conditions of moisture and temperature are not properly regulated, the result can be represented generally, by the equation:

4. 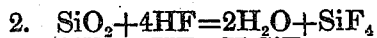 $3SiF_4 + 4H_2O = Si(OH)_4 + 2H_2SiF_6$

I have found that the reaction will proceed in accordance with equation (1), provided the temperature is not permitted to rise materially above 150° C., and, that to avoid the reactions represented by equations 2, 3 and 4, the temperature should not be allowed to fall materially below 100° C.

The invention is particularly important for the recovery of hydrofluoric acid from processes producing hydrofluosilicic acid, which is known only in aqueous solution, and from gaseous silicon fluorid, or for removing silicon fluorid from hydrofluoric acid and at the same time increasing the volume of the hydrofluoric acid by a further amount obtained from the silicon fluorid present.

The process is carried out by causing water or water vapor to act upon silicon fluorid within the range of temperatures referred to, thereby producing hydrofluoric acid and silica, and removing the hydrofluoric acid from the separated silica, under conditions that prevent the hydrofluoric acid from acting upon the silica to produce silicon fluorid and hydrofluosilicic acid.

Starting, for instance, with hydrofluosilicic acid, as the source of the silicon fluorid, the hydrofluosilicic acid may be placed in a still or retort, constructed of suitable material, and arranged to withstand a steam pressure from within of say 25 to 50 pounds per square inch. The still is provided with suitable means for heating the same, as, for instance, by admitting steam directly into the still, or it may be heated by an external fire, or otherwise.

In the accompanying drawing, I have illustrated, diagrammatically, a suitable assemblage of apparatus appropriate to the practice of the invention.

Referring to the drawing, A indicates a still, of any suitable kind, provided with means for charging it with hydrofluosilic acid, and for discharging the silica residue. The still is provided with a discharge pipe $a$ having a valve $b$, or the like, for closing the pipe when desired or for partially closing it so as to permit the pressure and temperature prevailing in the still to be regulated. A pipe $c$ is provided for admitting water, water vapor, or steam, into the still, for the purpose of carrying on the reaction, and the still is provided with a steam gage, thermometer, or other means of observing the temperature prevailing within.

The discharge pipe $a$ terminates in the bottom of a scrubber B of any suitable and convenient type and dips below the level of the body of water contained therein. The scrubber should be closed and should itself be provided with means for heating it. These means may, conveniently, consist of a steam jacket $h$, if desired, wherein the steam of the requisite pressure and temperature may be supplied from the boiler. The still A may likewise be similarly heated by a steam jacket $d$. The scrubber is provided with a steam gage, thermometer or other means of observing the temperature, and has a discharge pipe $e$ provided with a valve $f$, so that the gases from the scrubber may pass into a condenser and absorber C, containing a body of water as shown.

After sufficient hydrofluosilicic acid has been placed in the still A to fill it about one-third full, it should be heated until a temperature is obtained, which, for the best results, will be between 120° C. and 125° C. Thereupon, the valve $b$ leading from the still to the scrubber B should be opened allowing the gas to pass from the still to the scrubber and thence into the condenser and absorber C. Care should be taken to maintain the temperature in the still, at about the range specified, that is to say, between 120° C. and 125° C., and it should not be permitted to rise materially above 150° C., or to drop below 100 C.; otherwise, the reaction, at temperatures materially exceeding 150° C. would either cease altogether or would be very incomplete, and, at the lower temperatures approaching 100° C., the reversal of the reaction would be so considerable as to practically defeat the purposes of the process.

The gases coming from the scrubber will be found to consist of hydrofluoric acid, practically free from silicon fluorid; or, if any silicon fluorid is found in the gases, it can be removed by raising the temperature in the scrubber to approximately the same temperature prevailing in the still, so that, in such event, the scrubber will subserve the same function as the still, in converting into hydrofluoric acid and silica any silicon fluorid that may be present in the scrubber. In such case, an additional scrubber may be interposed between the first scrubber and the condenser and absorber C, this additional absorber being intended to lower the temperature of the hydrofluoric acid gas before it enters the condenser and absorber.

It will be understood that when the hydrofluosilicic acid in the still A is heated, the resultant vapor will consist of silicon fluorid and hydrofluoric acid, according to the equation:

$$H_2SiF_6 = SiF_4 + 2HF$$

and that, by maintaining the temperature, as specified, at 120° C. to 125° C., the reaction expressed by equation (1), of the present specification will take place, in the presence of the water vapor, without any material reversion to the reactions expressed by the equations 2 and 3.

Accordingly, it will be found that the hydrofluoric acid collected in the condenser and absorber is practically free from silica, and that all but a small trace of the silica produced will be left in the still, such small portion as may have been carried along mechanically or as may have been produced by condensation in the connecting pipe being arrested in the scrubber.

The residual silica contained in the still can be evaporated to dryness before emptying the still, and the still may then be supplied with a fresh solution of hydrofluosilicic acid, whereupon the operation can be continued as before; or fresh charges of hydrofluosilicic acid may be added to the still from time to time until a larger quantity of silica accumulates therein. It will be understood that the water vapor required for the reaction expressed by equation 1, may, in the case of hydrofluosilicic acid, be supplied from the aqueous solution itself in which the gas is contained.

It will be further understood, of course, that whether the silicon fluorid is derived from an aqueous solution of hydrofluosilicic acid, or whether it is present as an impurity in hydrofluoric acid gas, or whether it is derived from some other source than hydrofluosilicic acid, the same fundamental reaction is involved in converting it into hydrofluoric acid and the same conditions are maintained in effecting its transformation.

What I claim is:

1. The process of producing hydrofluoric acid from silicon fluorid, which comprises acting upon the silicon fluorid with water vapor at a temperature which will produce hydrofluoric acid and which will not permit any material reaction between the hydrofluoric acid and the silicon hydrate formed.

2. The process of producing hydrofluoric acid from silicon fluorid, which comprises acting upon the silicon fluorid with water vapor within the range of temperatures included between 100° C. and 150° C.

3. The process of producing hydrofluoric acid from silicon fluorid, which comprises acting upon the silicon fluorid with water vapor at a temperature of substantially 150° C.

4. The process of producing hydrofluoric acid from silicon fluorid, which comprises acting upon the silicon fluorid with water vapor within the range of temperatures included between 100° and 150° C., scrubbing the hydrofluoric acid gas formed and finally condensing and absorbing it in water.

5. The process of producing hydrofluoric acid from hydrofluosilicic acid, which comprises heating an aqueous solution of hydrofluosilicic acid to convert it into hydrofluoric acid, silicon fluorid and water vapor, and maintaining the resultant compounds at a temperature that will cause the water vapor to act upon the silicon fluorid to produce hydrofluoric acid and silicon hydrate, and removing the hydrofluoric acid from the silicon hydrate.

In testimony whereof I affix my signature.

HOWARD FIELD CHAPPELL.